US010246082B2

(12) United States Patent
Lindström et al.

(10) Patent No.: US 10,246,082 B2
(45) Date of Patent: Apr. 2, 2019

(54) PROPULSION SYSTEM FOR A VEHICLE

(71) Applicant: Scania CV AB, Södertälje (SE)

(72) Inventors: Johan Lindström, Nyköping (SE);
Mathias Björkman, Tullinge (SE);
Mikael Bergquist, Huddinge (SE);
Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 112 days.

(21) Appl. No.: 15/107,003

(22) PCT Filed: Dec. 22, 2014

(86) PCT No.: PCT/SE2014/051557
§ 371 (c)(1),
(2) Date: Jun. 21, 2016

(87) PCT Pub. No.: WO2015/099591
PCT Pub. Date: Jul. 2, 2015

(65) Prior Publication Data
US 2017/0001635 A1 Jan. 5, 2017

(30) Foreign Application Priority Data
Dec. 23, 2013 (SE) ..................... 1351578

(51) Int. Cl.
B60W 10/02 (2006.01)
B60W 20/40 (2016.01)
(Continued)

(52) U.S. Cl.
CPC ............. B60W 20/40 (2013.01); B60K 1/02 (2013.01); B60K 6/365 (2013.01); B60K 6/387 (2013.01);
(Continued)

(58) Field of Classification Search
CPC ...... B60W 20/40; B60W 10/06; B60W 10/08; B60W 10/02; F16H 3/725; B60K 6/48;
(Continued)

(56) References Cited

U.S. PATENT DOCUMENTS 5,433,282 A 7/1995 Moroto et al.
5,492,189 A 2/1996 Kriegler et al.
(Continued)

FOREIGN PATENT DOCUMENTS

DE 19628000 A1 1/1997
DE 19838853 A1 3/1999
(Continued)

OTHER PUBLICATIONS

Written Opinion of the International Search Authority for PCT/SE14/051557 dated Apr. 22, 2015.
(Continued)

Primary Examiner — Roger L Pang
(74) Attorney, Agent, or Firm — Moore & Van Allen PLLC; W. Kevin Ransom

(57) ABSTRACT

A drive system for a vehicle comprises an electrical machine, arranged between a combustion engine and an input shaft to a gearbox. The rotor of the electrical machine is connected with a component of a planetary gear, and the input shaft of the gearbox is connected with another component of such planetary gear. A first locking means may be moved between a locked position, in which the planetary gear's three components rotate at the same rotational speed, and a release position, in which the components are allowed to rotate at different rotational speeds. A second locking means is moveable between a locked position in which the output shaft of the combustion engine is locked together with a component in the planetary gear, and a release
(Continued)

position, in which the combustion engine's output shaft is decoupled from such a component.

7 Claims, 2 Drawing Sheets

(51) Int. Cl.
| | |
|---|---|
| B60K 6/365 | (2007.10) |
| B60K 6/387 | (2007.10) |
| B60K 6/40 | (2007.10) |
| B60W 10/08 | (2006.01) |
| B60W 20/00 | (2016.01) |
| B60K 6/48 | (2007.10) |
| F16H 3/72 | (2006.01) |
| B60K 1/02 | (2006.01) |
| B60K 6/46 | (2007.10) |
| B60W 10/06 | (2006.01) |
| B60W 30/18 | (2012.01) |
| B60K 6/547 | (2007.10) |

(52) U.S. Cl.
CPC ............... *B60K 6/40* (2013.01); *B60K 6/46* (2013.01); *B60K 6/48* (2013.01); *B60W 10/02* (2013.01); *B60W 10/06* (2013.01); *B60W 10/08* (2013.01); *B60W 20/00* (2013.01); *B60W 30/18027* (2013.01); *B60W 30/18072* (2013.01); *F16H 3/725* (2013.01); *F16H 3/727* (2013.01); *B60K 6/547* (2013.01); *B60K 2006/4825* (2013.01); *B60W 30/18* (2013.01); *B60W 2710/125* (2013.01); *B60Y 2300/84* (2013.01); *Y02T 10/6221* (2013.01); *Y02T 10/6252* (2013.01); *Y02T 10/6286* (2013.01); *Y10S 903/945* (2013.01); *Y10T 477/26* (2015.01)

(58) Field of Classification Search
CPC .......... B60K 6/365; B60K 6/40; B60K 6/387; B60K 2006/4825; Y02T 10/6221; Y02T 10/6252
See application file for complete search history.

(56) References Cited

U.S. PATENT DOCUMENTS

| | | | |
|---|---|---|---|
| 5,508,574 A | 4/1996 | Vlock | |
| 6,018,198 A | 1/2000 | Tsuzuki et al. | |
| 6,083,138 A | 7/2000 | Aoyama et al. | |
| 6,354,974 B1 | 3/2002 | Kozarekar | |
| 6,579,201 B2 | 6/2003 | Bowen | |
| 7,237,634 B2 | 7/2007 | Severinsky et al. | |
| 7,282,008 B2 | 10/2007 | Oshidari | |
| 8,182,391 B2 | 5/2012 | Klemen et al. | |
| 8,403,807 B2 | 3/2013 | Tabata et al. | |
| 8,500,589 B2 | 8/2013 | Ortmann et al. | |
| 8,840,502 B2 | 9/2014 | Bergquist | |
| 8,905,892 B1 | 12/2014 | Lee et al. | |
| 9,139,076 B2 | 9/2015 | Lee et al. | |
| 9,266,418 B2 | 2/2016 | Lee et al. | |
| 9,327,716 B2 * | 5/2016 | Pettersson ............... | B60K 6/365 |
| 9,441,708 B2 | 9/2016 | Kimes et al. | |
| 9,592,821 B2 * | 3/2017 | Pettersson ............... | B60K 6/365 |
| 9,643,481 B2 | 5/2017 | Goleski et al. | |
| 9,937,920 B2 | 4/2018 | Lindstrom et al. | |
| 2005/0049100 A1 | 3/2005 | Ai et al. | |
| 2007/0056784 A1 | 3/2007 | Joe et al. | |
| 2007/0102209 A1 | 5/2007 | Doebereiner | |
| 2008/0009380 A1 | 1/2008 | Iwanaka et al. | |
| 2008/0081734 A1 | 4/2008 | Duffy et al. | |
| 2008/0275625 A1 | 11/2008 | Snyder | |
| 2008/0318728 A1 | 12/2008 | Soliman et al. | |
| 2009/0075779 A1 | 3/2009 | Kumazaki et al. | |
| 2009/0076694 A1 | 3/2009 | Tabata et al. | |
| 2009/0145673 A1 | 6/2009 | Soliman et al. | |
| 2010/0063660 A1 | 3/2010 | Uchida | |
| 2010/0099532 A1 | 4/2010 | Cashen | |
| 2012/0028757 A1 | 2/2012 | Kimura et al. | |
| 2012/0197475 A1 | 8/2012 | Akutsu et al. | |
| 2012/0244992 A1 | 9/2012 | Hisada et al. | |
| 2012/0245774 A1 | 9/2012 | Takami et al. | |
| 2013/0102429 A1 | 4/2013 | Kaltenbach et al. | |
| 2013/0109530 A1 * | 5/2013 | Kaltenbach ............... | B60K 6/387 477/5 |
| 2013/0297134 A1 | 11/2013 | Saito et al. | |
| 2013/0316865 A1 | 11/2013 | Engström et al. | |
| 2014/0024490 A1 | 1/2014 | Bangura et al. | |
| 2014/0051537 A1 | 2/2014 | Liu et al. | |
| 2014/0243149 A1 | 8/2014 | Holmes et al. | |
| 2015/0046009 A1 | 2/2015 | Maruyama et al. | |
| 2015/0051773 A1 | 2/2015 | Hayashi et al. | |
| 2015/0149012 A1 * | 5/2015 | Pettersson ............... | B60K 6/365 701/22 |
| 2015/0239459 A1 | 8/2015 | Pettersson et al. | |
| 2015/0375734 A1 | 12/2015 | Pettersson et al. | |
| 2016/0052381 A1 * | 2/2016 | Kaltenbach ............... | B60K 6/365 180/65.23 |
| 2016/0159344 A1 | 6/2016 | Hata et al. | |
| 2016/0176396 A1 | 6/2016 | Hata et al. | |
| 2016/0288784 A1 | 10/2016 | Teraya et al. | |
| 2017/0001622 A1 * | 1/2017 | Lindstrom ............... | B60K 6/365 |
| 2017/0001634 A1 | 1/2017 | Lindstrom et al. | |
| 2017/0043763 A1 | 2/2017 | Ketfi-Cherif et al. | |
| 2017/0144649 A1 | 5/2017 | Bangura et al. | |
| 2017/0282702 A1 | 10/2017 | Kim | |

FOREIGN PATENT DOCUMENTS

| | | |
|---|---|---|
| DE | 19841829 A1 | 3/2000 |
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 19838853 B4 | 11/2013 |
| EP | 552140 A1 | 10/1995 |
| EP | 552140 B1 | 10/1995 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| FR | 2832356 A1 | 5/2003 |
| JP | 07135701 A | 5/1995 |
| JP | 11332018 A | 11/1999 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 0006407 A1 | 2/2000 |
| WO | 2007113438 A1 | 10/2007 |
| WO | 2007147732 A1 | 12/2007 |
| WO | 2008016357 A2 | 2/2008 |
| WO | 2011070390 A1 | 6/2011 |

(56) References Cited

FOREIGN PATENT DOCUMENTS

WO    2012091659 A1    7/2012
WO    2013002707 A1    1/2013

OTHER PUBLICATIONS

International Search Report for PCT/SE2014/051558 dated Apr. 22, 2015.
International Preliminary Report on Patentability for PCT/SE14/051557 dated Jun. 28, 2016.

* cited by examiner

PROPULSION SYSTEM FOR A VEHICLE

CROSS REFERENCE TO THE APPLICATION

This application is a national stage application (filed under 35 § U.S.C. 371) of PCT/SE2014/051557, filed Dec. 22, 2014 of the same title, which, in turn claims priority to Swedish Application No. 1351578-8, filed Dec. 23, 2013 of the same title; the contents of each of which are hereby incorporated by reference.

FIELD OF THE INVENTION

The present invention relates to a drive system for a vehicle, and is particularly, but not exclusively, focused on such a drive system in motor vehicles in the form of wheeled commercial vehicles, especially heavy goods vehicles such as trucks and buses. The invention thus relates to a drive system for driving a hybrid vehicle which, generally, is a vehicle that may be powered by a primary engine, in this case a combustion engine, and a secondary engine, in this case an electrical machine. The vehicle is suitably equipped with means for storage of energy, such as a battery or a capacitor for storage of electric energy, and control equipment to control the flow of electric energy between the means and the electrical machine. The electrical machine may thus alternately operate as an engine or as a generator, depending on the vehicle's operating mode. When the vehicle decelerates, the electrical machine generates electric energy that may be stored, and the stored electric energy is used later for e.g. operation of the vehicle.

BACKGROUND OF THE INVENTION

Using a conventional clutch mechanism, which disconnects the input shaft of the gearbox from the combustion engine during a shifting process in the gearbox, entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and disadvantages associated therewith may be avoided. A vehicle with a drive system of this type constitutes prior art as set out in EP 1 319 546 and SE 1051384-4.

Although this drive system, especially the one described in SE 1051384-4, functions well and has a range of advantageous features, efforts are constantly made to improve such a drive system with respect to its behavior and function in certain operating situations.

SUMMARY OF THE INVENTION

The objective of the present invention is to show a drive system of the type defined above, which is in line with the above-mentioned efforts. This objective is achieved according to the invention by providing a drive system.

By equipping the drive system with said second locking means, an improved behavior is obtained in a range of operational situations compared to such prior art drive systems. Specifically, it becomes possible at braking of the vehicle to choose to disconnect the combustion engine before it reaches its idling speed. By moving the second locking means to its release position, so that the combustion engine is decoupled, it is possible to brake with full electrical machine torque until the vehicle stops, by keeping the planetary gear in its locked position, i.e. with the first locking means in a locked position. At this stage, one may optionally let the combustion engine run at idling speed or turn it off.

With the innovative drive system it is therefore possible to brake at full electrical machine torque, as opposed to braking with a corresponding drive system not comprising anything corresponding to the second locking means. With such a corresponding drive system, it is therefore possible to brake only with a torque providing a reaction torque to the combustion engine, smaller than or equal to its resulting friction torque, unless it is intended that the combustion engine should be allowed to rev up.

Since it is possible to brake at full electrical machine torque with the innovative drive system, without turning off the combustion engine, the combustion engine does not need to be started again in case the driver of the vehicle chooses to interrupt the braking and to request a large driving torque instead. It also becomes possible to start driving the vehicle from a standstill without starting the combustion engine, since the second locking means is kept in a release position, and the first locking means is kept in a locked position, and the electrical machine in this case rotates the input shaft of the gearbox with the same rotation speed as its rotor. The possibility of decoupling the combustion engine by moving the second locking means to a release position may also be used in driving modes at low positive and negative powertrain torques, to save fuel and thus keep the combustion engine at an idling speed or turn it off, and to power the vehicle only with the electrical machine.

According to one embodiment of the invention, said second locking means are adapted to, in said release position, separate a first part of the combustion engine's output shaft, arranged nearest the combustion engine, from a second part thereof, connected with said first component of the planetary gear.

According to another embodiment of the invention, the combustion engine's output shaft, the electrical machine's rotor and the input shaft of the gearbox are rotatably arranged around a common rotation axis.

According to another embodiment of the invention, the planetary gear's sun wheel constitutes said first component and the ring gear constitutes said third component. By connecting the first electrical machine's rotor with the ring gear and the combustion engine's output shaft with the sun wheel, a compact construction is achieved, which is easy to fit into already existing spaces for powertrains (drive systems) with clutch mechanisms instead of planetary gears. Accordingly, a hybrid gearbox may be made compact and substantially no bulkier than a standard gearbox. This also entails that the weight increase, which a hybridization normally involves, may be reduced considerably. Another advantage is that a connection of the first electrical machine's rotor with the ring gear provides a higher potential braking torque via the rotor, than if this were connected with the sun wheel instead.

According to another embodiment of the invention, the drive system comprises at least one control device, adapted to control the fuel supply to the combustion engine and to control the exchange of electric energy between the electrical machine and electric energy storage means. The control device is advantageously also adapted to control said locking means to be moved between said locked position and release position and, in order to lock them together, to control the combustion engine and/or the electrical machine to achieve the same rotational speed in the parts to be locked together by the respective locking means, and, subsequently, to move the locking means to a locked position, and, in order to release them, to control the combustion engine and/or the electrical machine to achieve torque balance between the parts to be released from each other, and, subsequently, to control the locking means to be moved to a release position. Zero torque is a case of torque balance.

Here, torque balance is achieved when the following relation between the torques applied is met for the example configuration displayed in FIG. 3:

$$T_{sun\ wheel} = \frac{Z_s}{Z_r} T_{ring\ gear}$$

where $T_{sun\ wheel}$ and $T_{ring\ gear}$ constitute torque applied on the sun wheel and the ring gear, respectively, $Z_s$ is the number of teeth of the sun wheel, $Z_r$ is the number of teeth of the ring gear.

Accordingly, torque balance means the state where a torque acts on a ring gear arranged in the planetary gear, corresponding to the product of the torque acting on the planetary gear's planetary wheel carrier and the planetary gear's gear ratio, while simultaneously a torque acts on the planetary gear's sun wheel, corresponding to the product of the torque acting on the planetary wheel carrier and (1 minus the planetary gear's gear ratio).

According to another embodiment of the invention, the control device is adapted to control, when the vehicle is driven with the combustion engine running, and the second locking means in a locked position when braking the vehicle, the electrical machine to apply a braking torque to the input shaft of the gearbox throughout the braking of the vehicle, the combustion engine and the electrical machine to a synchronous rotational speed of the input shaft of the gearbox, the electrical machine's rotor and the combustion engine's output shaft if the first locking means is in a release position, and to move the first locking means to a locked position, the combustion engine towards a zero torque between the combustion engine's output shaft and said first component, when a certain value of the vehicle's speed is not met, the second locking means to be moved to the release position, and the combustion engine towards and to idling speed.

By thus braking with the electrical machine throughout the braking procedure, and decoupling the combustion engine before it reaches its idling speed, it is possible to brake with full electrical machine torque as of said decoupling, while the combustion engine may be kept running, if desired, in order to provide for preparedness, should the braking be interrupted.

According to another embodiment of the invention, the control device is adapted, at braking of the vehicle towards a stop, and further in connection with the control of the combustion engine towards idling speed, to control the ramping down of the braking torque from the electrical machine towards zero in connection with the vehicle stopping.

According to another embodiment of the invention, the control device is adapted to control, in order to start driving the vehicle, when the vehicle is at a standstill with the combustion engine turned off, the second locking means to be moved to the release position if it is in a locked position, the first locking means to be moved to the locked position if it is in a release position, and the electrical machine for to deliver a torque thereof, so that the requested torque is transmitted to the input shaft of the gearbox.

Accordingly, the vehicle may be started and driven while powered purely electrically.

The invention also relates to a vehicle, and methods with the method steps that the control device is adapted to carry out in the above-mentioned embodiments of the drive system according to the invention.

Other advantageous features and advantages of the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
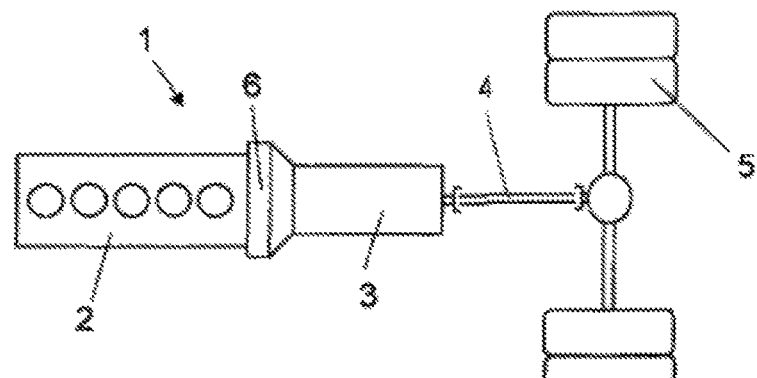
FIG. 1 is a very simplified view of a powertrain in a vehicle, which may be equipped with a drive system according to the invention.
Figure 2:
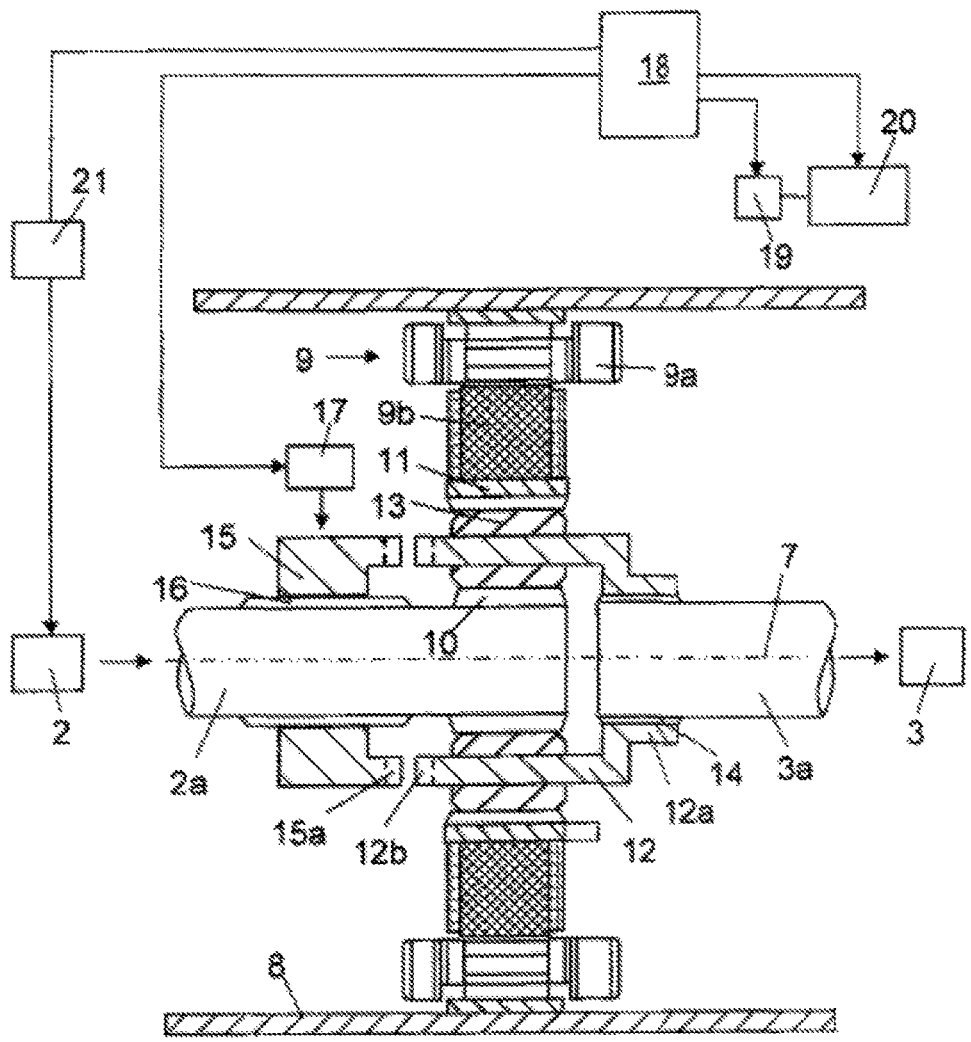
FIG. 2 is a more detailed, but still simplified view of a part of said drive system.

FIG. 1 shows a powertrain for a heavy goods vehicle 1. The powertrain comprises a combustion engine 2, a gearbox 3, a number of driving shafts 4 and driving wheels 5. Between the combustion engine 2 and the gearbox 3, the powertrain comprises an intermediate section 6. FIG. 2 shows a part of the components in the intermediate section 6 in more detail, more specifically those that also occur in prior art drive systems, such as the one according to SE 1051384-4. The combustion engine 2 is equipped with an output shaft 2a, and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator core which is mounted in a suitable manner on the inside of the house 8. The stator core comprises the stator's windings. The electrical machine 9 is adapted to, under certain operating circumstances, use stored electrical energy to supply driving force to the input shaft 3a of the gearbox, and, under other operating conditions, to use the kinetic energy of the input shaft 3 of the gearbox to extract and store electric energy.

The planetary gear is arranged substantially radially on the inside in relation to the electrical machine's stator 9a and rotor 9*b*. The planetary gear comprises, in a customary manner, a sun wheel 10, a ring gear 11 and a planetary wheel carrier 12. The planetary wheel carrier 12 supports a number of cogwheels 13, which are rotatably arranged in a radial space between the teeth of the sun wheel 10 and the ring gear 11. The sun wheel 10 is fixed on a peripheral surface of the combustion engine's output shaft 2*a*. The sun wheel 10 and the combustion engine's output shaft 2*a* rotate as one unit with a first rotational speed $n_1$. The planetary wheel carrier 12 comprises an attachment section 12*a*, which is attached on a peripheral surface of the input shaft 3*a* of the gearbox with the help of a splines joint 14. With the help of this joint, the planetary wheel carrier 12 and the input shaft 3*a* of the gearbox may rotate as one unit with a second rotational speed $n_2$. The ring gear 11 comprises an external peripheral surface on which the rotor 9*b* is fixedly mounted. The rotor 9*b* and the ring gear 11 constitute a rotatable unit that rotates with a third rotational speed $n_3$.

The drive system comprises a first locking means, since the combustion engine's output shaft 2*a* is equipped with a shiftable clutch element 15. The clutch element 15 is mounted on the combustion engine's output shaft 2*a* with the help of a splines joint 16. The clutch element 15 is in this case arranged in a twist-fast manner on the combustion engine's output shaft 2*a*, and is shiftably arranged in an axial direction on the combustion engine's output shaft 2*a*. The clutch element 15 comprises a clutch section 15*a*, which is connectible with a clutch section 12*b* in the planetary wheel carrier 12. A schematically displayed shifting element 17 is adapted to shift the clutch element 15 between a first position where the clutch sections 15*a*, 12*b* are not in engagement with each other, corresponding to a release position in the first locking means, and a second position where the clutch sections 15*a*, 12*b* are in engagement with each other, corresponding to a locked position of the first locking means. In this locked position the combustion engine's output shaft 2*a* and the input shaft 3*a* of the gearbox will be locked together, and these, as well as the electrical machine's rotor, will thus rotate at the same rotational speed. This state may be referred to as a locked planet. The locking mechanism may, advantageously, also have the design which is described in the not yet public Swedish patent application 1250696-0, and comprise a sleeve equipped with first splines, which splines, in the release position, engage with second splines on a first component of the planetary gear and, in the locked position, engage with third splines on a second component of the planetary gear. In this case, the first component is preferably the planetary wheel carrier, and the second component is the sun wheel. The locking mechanism may then be adapted like an annular sleeve, enclosing the planetary wheel carrier substantially concentrically. The locking means may also consist of a suitable type of friction clutch.

At least the second locking means is preferably of a type that locks in case of a fault in its maneuvering system, so that the vehicle may then be driven to a garage.

An electric control device 18 is adapted to control the shifting element 17. The control device 18 is also adapted to determine the occasions on which the electrical machine should operate as an engine, and on which occasions it should operate as a generator. To determine this, the control device 18 may receive up-to-date information relating to suitable operating parameters. The control device 18 may be a computer with software for this purpose. The control device 18 controls a schematically displayed control equipment 19, which controls the flow of electric energy between a hybrid battery 20 and the stator windings 9*a* of the electrical machine. On occasions where the electrical machine 9 operates as an engine, stored electric energy is supplied from the hybrid battery 20 to the stator 9*a*. On occasions where the electrical machine operates as a generator, electric energy is supplied from the stator 9*a* to the hybrid battery 20. The hybrid battery 20 delivers and stores electric energy with a voltage in the range of 300-900 volts. Since the intermediate section 6 between the combustion engine 2 and the gearbox 3 in the vehicle is limited, the electrical machine 9 and the planetary gear must constitute a compact unit. The planetary gear's components 10, 11, 12 are arranged substantially radially inside the electrical machine's stator 9*a*. The rotor 9*b* of the electrical machine, the ring gear 11 of the planetary gear, the combustion engine's output shaft 2*a*, and the input shaft 3*a* of the gearbox, are here rotatably arranged around a common rotation axis 5. With such an embodiment, the electrical machine 9 and the planetary gear occupy a relatively small area. The vehicle 1 is equipped with an engine control function 21 with which the engine speed $n_1$ of the combustion engine 2 may be controlled. The control device 18 thus has the possibility of activating the engine control function 21 and of creating a substantially zero torque state in the gearbox 3 at engagement and disengagement of gears in the gearbox 3. The drive system may also, instead of being controlled by one single control device 18, be controlled by several different control devices.

Figure 3:
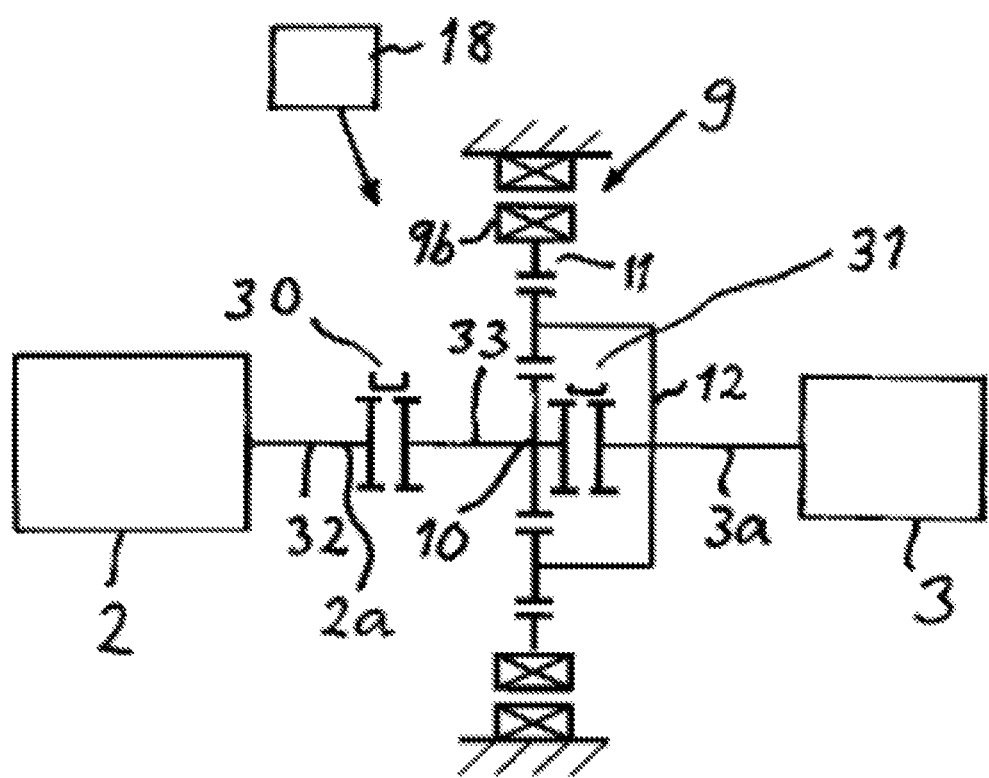
FIG. 3 is a simplified view illustrating the general structure of a drive system according to one embodiment of the invention.

The part of the drive system according to the invention described thus far and displayed in FIG. 2 is present in the drive system according to SE 1051384-4. Below, the part of the drive system according to the invention, which has been added to this part, will be described with reference to FIG. 3.

According to the invention, the drive system, specifically the intermediate section 6, also has a second locking means 30, which may have a similar design to the first locking means 31, illustrated in more detail in FIG. 2, and is adapted to, in a release position, separate a first part 32 of the combustion engine's output shaft, arranged nearest the combustion engine, from a second part 33 thereof, connected with the planetary gear's sun wheel 10, so that the sun wheel 10 is allowed to rotate independently of the first part 32 of the combustion engine's output shaft. The second locking means may be moved to a locked position, in which the parts 32, 33 of the combustion engine's output shaft are locked together. The control device 18 is adapted to control fuel supply to the combustion engine 2 and to control exchange of electric energy between the electrical machine 9 and electric energy storage means, such as batteries.

A range of positive features of the drive system are achieved by way of the added arrangement of the second locking means 30, some of the most important of which have been described in the introduction of this document. For example, when the vehicle is driven with the combustion engine 2 running, and with the second locking means 30 in a locked position, at braking of the vehicle the electrical machine 9 may apply a braking torque on the input shaft 3*a* of the gearbox throughout the braking of the vehicle. Accordingly, the combustion engine 2 may be decoupled by way of moving the second locking means 30 to a release position before the combustion engine reaches its idling engine speed, and braking may therefore occur with a full electrical machine torque, if desired until the vehicle stops, with the planetary gear in its locked state, i.e. the first locking means 31 in a locked position.

The invention is obviously not limited in any way to the embodiments described above, but numerous possible modifications thereof should be obvious to a person skilled in the area, without such person departing from the spirit of the invention as defined by the appended claims.

The first locking means may be adapted to lock together any two of said three components.

A transmission could be arranged between the rotor and the ring gear, and also between the combustion engine's output shaft and the sun wheel, such as upstream of the shaft which is displayed in FIG. 2 to be connected with the sun wheel. The latter transmission could also consist of a variable gear.

It is also conceivable that the drive system has the ring gear as the first component and the sun wheel as the third component, even if the reverse would be preferable because of the advantages mentioned above.

The methods according to the not yet published Swedish patent applications 1250711-7, 1250716-6, 1250708-3, 1250698-6, 1250706-7, 1250699-4, 1250700-0, 1250702-6, 1250720-8, 1200394-3, 1200390-1, 1250717-4 and 1250718-2 may be carried out with the drive system configuration according to the present invention.

The invention claimed is:

1. A drive system for a vehicle, wherein the drive system comprises:
   an output shaft in a combustion engine;
   an input shaft of a gearbox;
   an electrical machine comprising a stator and a rotor;
   a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components;
   a first locking means, which may be moved between a locked position in which two of said components are locked together so that the three components rotate with the same rotational speed, and a release position in which the components are allowed to rotate at different rotational speeds;
   a second locking means, which may be moved between a locked position in which the combustion engine's output shaft is locked to said first of said components, and a release position, in which the output shaft of the combustion engine is disconnected from said first of said components, and is allowed to rotate independently; and
   at least one control device, adapted to control fuel supply to the combustion engine and to control exchange of electrical energy between the electrical machine and storage means for electric energy,
   wherein the control device is adapted to control said first and second locking means to be moved between said locked position and release position and, in order to lock, to control the combustion engine and/or the electrical machine to achieve the same rotational speed in the parts to be locked together by the respective first and second locking means, and, subsequently, to control the locking means to be moved to a locked position and, in order to release, to control the combustion engine and/or the first electrical machine to achieve a torque balance between the parts to be released from each other, and, subsequently, to control the first and second locking means to be moved to a release position, and
   wherein the control device is adapted to control, when the vehicle is driven with the combustion engine running, and with the second locking means in a locked position at braking of the vehicle:
     the electrical machine to apply a braking torque to the input shaft of the gearbox throughout the braking of the vehicle;
     the combustion engine and the electrical machine to a synchronous rotational speed of the input shaft of the gearbox, the electrical machine's rotor (9b) and the combustion engine's output shaft if the first locking means is in a release position, and to move the first locking means to a locked position;
     the combustion engine towards a zero torque between the combustion engine's output shaft and said first of said components, when a certain value of a vehicle speed is not met;
     the second locking means to be moved to the release position; and
     the combustion engine towards and to idling speed.

2. The drive system according to claim 1, wherein said second locking means is adapted to, in said release position, separate a first part, arranged nearest the combustion engine, of the output shaft of the combustion engine from a second part thereof, connected with said first of said components of the planetary gear.

3. The drive system according to claim 1, wherein the output shaft of the combustion engine, the rotor of the electrical machine, and the input shaft of the gearbox are rotatably arranged around a common rotation axis.

4. The drive system according to claim 1, wherein the planetary gear's sun wheel is said first of said components and the ring gear is said third of said components.

5. The drive system according to claim 1, wherein the control device is adapted, when the vehicle decelerates to stop, and further in connection with control of the combustion engine towards idling speed, to control the ramping down of the braking torque from the electrical machine towards zero in connection with the vehicle stopping.

6. The drive system according to claim 1, wherein the control device is adapted to control, in order to start driving the vehicle, when the vehicle is at a standstill with the combustion engine turned off:
   the second locking means to be moved to the release position if the second locking means is in a locked position;
   the first locking means to be moved to the locked position if the first locking means is in a release position; and
   the electrical machine to deliver a torque thereof, so that the requested torque is transmitted to the input shaft of the gearbox.

7. A vehicle comprising a drive system wherein the drive system comprises:
   an output shaft in a combustion engine;
   an input shaft of a gearbox;
   an electrical machine comprising a stator and a rotor;
   a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components;

a first locking means, which may be moved between a locked position in which two of said components are locked together so that the three components rotate with the same rotational speed, and a release position in which the components are allowed to rotate at different rotational speeds;

a second locking means, which may be moved between a locked position in which the combustion engine's output shaft is locked to said first of said components, and a release position, in which the output shaft of the combustion engine is disconnected from said first of said components, and is allowed to rotate independently; and at least one control device, adapted to control fuel supply to the combustion engine and to control exchange of electrical energy between the electrical machine and storage means for electric energy, wherein the control device is adapted to control said first and second locking means to be moved between said locked position and release position and, in order to lock, to control the combustion engine and/or the electrical machine to achieve the same rotational speed in the parts to be locked together by the respective first and second locking means, and, subsequently, to control the locking means to be moved to a locked position and, in order to release, to control the combustion engine and/or the first electrical machine to achieve a torque balance between the parts to be released from each other, and, subsequently, to control the first and second locking means to be moved to a release position, and wherein the control device is adapted to control, when the vehicle is driven with the combustion engine running, and with the second locking means in a locked position at braking of the vehicle:

the electrical machine to apply a braking torque to the input shaft of the gearbox throughout the braking of the vehicle;

the combustion engine and the electrical machine to a synchronous rotational speed of the input shaft of the gearbox, the electrical machine's rotor ($9b$) and the combustion engine's output shaft if the first locking means is in a release position, and to move the first locking means to a locked position;

the combustion engine towards a zero torque between the combustion engine's output shaft and said first of said components, when a certain value of a vehicle speed is not met;

the second locking means to be moved to the release position; and the combustion engine towards and to idling speed.

* * * * *